（12) United States Patent
Hagiwara

(10) Patent No.: US 11,703,666 B2
(45) Date of Patent: Jul. 18, 2023

(54) IMAGING LENS AND IMAGING DEVICE

(71) Applicant: TAMRON CO., LTD., Saitama (JP)

(72) Inventor: Hiroyuki Hagiwara, Saitama (JP)

(73) Assignee: TAMRON CO., LTD., Saitama (JP)

( * ) Notice: Subject to any disclaimer, the term of this patent is extended or adjusted under 35 U.S.C. 154(b) by 365 days.

(21) Appl. No.: 16/981,811

(22) PCT Filed: Dec. 17, 2018

(86) PCT No.: PCT/JP2018/046355
§ 371 (c)(1),
(2) Date: Sep. 17, 2020

(87) PCT Pub. No.: WO2019/234954
PCT Pub. Date: Dec. 12, 2019

(65) Prior Publication Data
US 2021/0018727 A1 Jan. 21, 2021

(30) Foreign Application Priority Data
Jun. 4, 2018 (JP) .................................. 2018-107099

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC .. G02B 13/0045; G02B 27/0025; G02B 9/62; G02B 9/60; G02B 9/64
See application file for complete search history.

(56) References Cited

U.S. PATENT DOCUMENTS 4,403,837 A 9/1983 Nakahashi
4,764,001 A 8/1988 Yokota
(Continued)

FOREIGN PATENT DOCUMENTS

JP S57-064207 A 4/1982
JP S60-263916 A 12/1985
(Continued)

OTHER PUBLICATIONS

English Translation of JP 2003057542 A (Year: 2003).*
(Continued)

*Primary Examiner* — Kristina M Deherrera
*Assistant Examiner* — Anna Elizabeth Smith
(74) *Attorney, Agent, or Firm* — Paratus Law Group, PLLC

(57) ABSTRACT

There is provided an imaging lens and an imaging device with a wide angle of view capable of forming an image of an object near an optical axis with a high resolution while having a small size as a whole. The imaging lens is an imaging lens including a first lens G1 having a convex surface on an object side and having a negative refractive power, a second lens G2 having a concave surface on an object side, a third lens G3, a fourth lens G4, a fifth lens G5, and a sixth lens G6, which are sequentially arranged from the object side, and satisfies a predetermined condition. Further, an imaging device according to the present invention includes the imaging lens.

18 Claims, 6 Drawing Sheets

(56) References Cited

U.S. PATENT DOCUMENTS

| | | | |
|---|---|---|---|
| 4,867,546 | A | 9/1989 | Nishioka et al. |
| 10,082,648 | B2 | 9/2018 | Usui et al. |
| 10,209,494 | B2 | 2/2019 | Usui et al. |
| 2015/0177491 | A1 | 6/2015 | Cho et al. |
| 2015/0207998 | A1 | 7/2015 | Lin et al. |
| 2017/0102526 | A1* | 4/2017 | Chen ............... G02B 13/0045 |
| 2018/0210177 | A1* | 7/2018 | Liu ................. G02B 13/0045 |
| 2019/0331900 | A1* | 10/2019 | Yao ................ G02B 13/0045 |

FOREIGN PATENT DOCUMENTS

| | | |
|---|---|---|
| JP | S61-162021 A | 7/1986 |
| JP | 2003-057542 A | 2/2003 |
| JP | 2017-037119 A | 2/2017 |
| JP | 2017-173807 A | 9/2017 |
| JP | 2018-040849 A | 3/2018 |

OTHER PUBLICATIONS

Mar. 19, 2019, International Search Report issued for related PCT Application No. PCT/JP2018/046355.
Mar. 19, 2019, International Search Opinion issued for related PCT Application No. PCT/JP2018/046355.

\* cited by examiner

IMAGING LENS AND IMAGING DEVICE

CROSS REFERENCE TO PRIOR APPLICATION

This application is a National Stage Patent Application of PCT International Patent Application No. PCT/JP2018/046355 (filed on Dec. 17, 2018) under 35 U.S.C. § 371, which claims priority to Japanese Patent Application No. 2018-107099 (filed on Jun. 4, 2018), which are all hereby incorporated by reference in their entirety.

TECHNICAL FIELD

The present invention relates to an imaging lens and an imaging device and particularly to an imaging lens and an imaging device suitable for a sensing camera.

BACKGROUND ART

Conventionally, an imaging device using a solid-state image sensor such as a Charge Coupled Device (CCD) image sensor or a Complementary Metal Oxide Semiconductor (CMOS) image sensor has become widespread. Specifically, an imaging device (hereinafter, referred to as an "in-vehicle imaging device or the like") such as an in-vehicle imaging device, a monitoring imaging device, and a crime prevention imaging device which are used for a specific purpose also has become widespread in addition to an imaging device such as a single lens reflex camera, a mirrorless camera, a digital camera, and the like which are carried by a user. In any of these imaging devices the progress of high performance and miniaturization is remarkable and imaging lenses (imaging optical systems) used in these imaging devices are also required to realize high performance and miniaturization. Particularly, the imaging lens is required to have a wider imageable range and higher resolution while maintaining a small size and a light weight in accordance with the recent progress of an increasing number of pixels of the image sensor.

Further, in recent years, the in-vehicle imaging device is used as a sensing camera and an image acquired by the in-vehicle imaging device is analyzed so as to perform various driving assistants. The in-vehicle imaging device serving as the sensing camera is becoming more important for the future realization of an automatic driving system.

As the imaging lens which is applicable to the in-vehicle imaging device or the like, various imaging lenses which have a relatively wide angle of view and in which a negative lens is disposed on an object side have been proposed.

For example, Patent Literature 1 proposes an imaging lens which includes six lenses including a negative lens, a meniscus lens having a concave surface on an object side, a positive lens having a biconvex shape, a negative lens, a positive lens, and a lens having an aspherical surface in order from the object side. In the imaging lens, the fifth lens and the sixth lens are formed as plastic lenses so as to achieve a decrease in weight and cost.

Further, Patent Literature 2 proposes an imaging lens which includes six lenses including a negative lens, a positive meniscus lens having a convex surface on an image side, a positive lens, a cemented lens of a positive lens and a negative lens, and a positive lens in order from the object side. The imaging lens can display an object near the optical axis to be larger than a peripheral object by increasing the angular resolution near the optical axis rather than the periphery in such a manner that the curvature of the surface on the object side of the first lens closest to the object side and the thickness on the optical axis of the first lens are defined. Here, the "number of pixels on the image sensor (image sensor) per each degree of the field angle of view" is defined as "angular resolution".

Further, Patent Literature 3 proposes an imaging lens which includes six lenses including a negative lens having a flat surface on an object side, a positive meniscus lens having a convex surface on an image side, a positive lens, a cemented lens of a positive lens and a negative lens, and a positive lens in order from the object side. The imaging lens is an objective lens for an endoscope and forms a flat surface on the object side of the negative lens closest to the object side. Accordingly, the imaging lens can be cleaned and disinfected and prevent water droplets from remaining on the most object side during cleaning and disinfection.

CITATION LIST

Patent Literature

Patent Literature 1: JP 2017-37119 A
Patent Literature 2: JP 2017-173807 A
Patent Literature 3: JP 2018-40849 A

SUMMARY OF THE INVENTION

Problems to be Solved by the Invention

Incidentally, the in-vehicle imaging device or the like is installed at a predetermined location inside and outside the vehicle or the like and is used continuously for a long time. The temperature inside a vehicle parked outdoors may change from below freezing to over 100 degrees. On the other hand, in the in-vehicle imaging device or the like, a fixed-focus imaging lens that does not include an actuator for focus adjustment is often used from the viewpoint of low cost. For that reason, in the imaging lens of the in-vehicle imaging device or the like, it is required that a focus variation is small even when an ambient temperature changes and good imaging performance is maintained for a long period of time not only at a room temperature but also in a high temperature environment and a low temperature environment.

In the imaging lens described in Patent Literature 1, the fifth lens and the sixth lens are plastic lenses Plastic lenses have a larger linear expansion coefficient than glass lenses and the refractive index changes with a change in ambient temperature. Further, the plastic lens may be altered or deformed in a high temperature environment. For that reason, when the imaging lens described in Patent Literature 1 is applied to the in-vehicle imaging device or the like, a focus variation occurs due to a change in ambient temperature. Accordingly, it is difficult to obtain good imaging performance under a high-temperature environment and a low-temperature environment.

Further, the in-vehicle imaging device or the like is required to clearly image a subject even under low illuminance such as at night. The F value of the imaging lens described in Patent Literature 1 achieves a relatively bright aperture ratio of 2.0, but the brightness is not sufficient to obtain a clear subject image under low illuminance.

In the imaging lens described in Patent Literature 2, since the curvature of the object side surface of the first lens is set to be small in order to increase the angular resolution in the vicinity of the optical axis, the correction of various aberrations is difficult and good imaging performance cannot be obtained. Further, since the thickness on the optical axis of the first lens is set to be larger in order to increase the angular resolution in the vicinity of the optical axis, it is difficult to miniaturize the imaging lens.

In the imaging lens described in Patent Literature 3, F value is about 3.0 and the brightness is insufficient to obtain a clear subject image under low illuminance. Further, since the object side surface of the first lens closest to the object side of the imaging lens is a flat surface, when the light reflected in the image plane is reflected again in the object side surface of the first lens and the light enters the image plane, ghosts occur. When ghosts occur in the sensing camera, an object or the like is erroneously recognized and the imaging lens cannot be applied to the sensing camera.

Here, an object of the present invention is to provide an imaging lens and an imaging device with a wide angle of view capable of forming an image of an object near an optical axis with a high resolution while having a small size as a whole.

Solutions to Problems

In order to solve the above-described problems, an imaging lens according to the present invention is an imaging lens substantially including six lenses sequentially arranged from an object side and including a first lens having a convex surface on the object side and having a negative refractive power and a second lens having a concave surface on the object side and satisfies the following conditions:

$$1.30 < R11/f < 10.0 \tag{1}$$

where

R11 is the paraxial curvature radius of the object side surface of the first lens, and f is the focal length of the imaging lens.

Further, in order to solve the above-described problems, an imaging device according to the present invention includes the above-described imaging lens and an image sensor which receives an optical image formed by the imaging lens and converts the optical image into an electric image signal.

Effects of the Invention

According to the present invention, it is possible to provide an imaging lens and an imaging device with a wide angle of view capable of forming an image of an object near an optical axis with a high resolution while having a small size as a whole.

DESCRIPTION OF EMBODIMENTS

Figure 1:
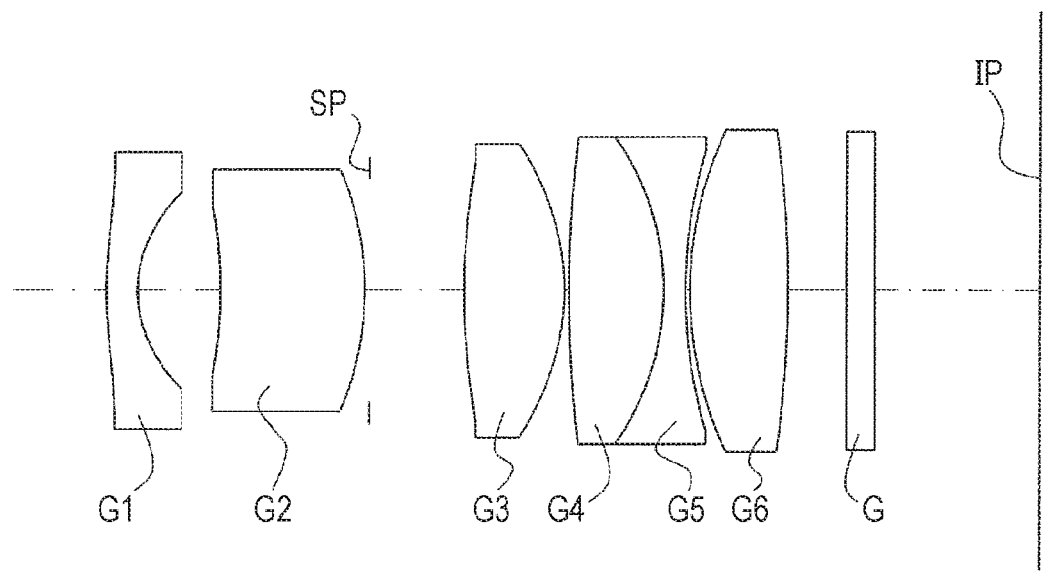
FIG. 1 is a cross-sectional view showing a lens configuration example of an imaging lens of a first embodiment of the present invention.

Hereinafter, embodiments of an imaging lens and an imaging device according to the present invention will be described.

1. Imaging Lens 1-1. Optical Configuration of Imaging Lens

First, an embodiment of an imaging lens according to the present invention will be described. The imaging lens of the embodiment substantially includes a first lens having a convex surface on an object side and having a negative refractive power, a second lens having a concave surface on an object side, a third lens, a fourth lens, a fifth lens, and a sixth lens which are sequentially arranged from the object side. Here, "substantially including" means that optical elements substantially constituting the imaging lens include six lenses from the first lens to the sixth lens, but are allowed to include a lens having substantially no power, an optical element other than a lens such as a diaphragm or a cover glass, and the like.

In the imaging lens, the first lens which is disposed closest to the object side has a convex surface on the object side and has a negative refractive power. For that reason, the image side of the first lens is a concave surface. Further, the object side of the second lens is a concave surface. Thus, an air lens which is formed between the first lens and the second lens has a biconvex shape. Since this biconvex air lens can correct various aberrations satisfactorily, the negative refractive power of the first lens can be made stronger and the outer diameter of the first lens can be decreased. As a result, it is possible to realize an imaging lens having a small size as a whole while realizing good imaging performance.

Further, since the air lens formed between the first lens and the second lens has a biconvex shape, spherical aberration and field curvature are easily corrected and an imaging lens having good imaging performance is easily realized even when an angle becomes wide.

Incidentally, when an in-vehicle imaging device is installed in a vehicle, it is required that the presence of the in-vehicle imaging device is not visible from the outside of the vehicle. Particularly, in the case of a sensing camera that performs forward sensing, the in-vehicle imaging device needs to be installed in a narrow space between a front glass and a room mirror of the vehicle so as not to be visible from the outside. In the imaging lens, a miniaturization of the imaging device as a whole is facilitated since the outer diameter of the first lens can be reduced and the imaging device is suitable for such an imaging optical system since the presence of the in-vehicle imaging device is less likely visible. The same applies to other imaging devices including a monitoring imaging device, a crime prevention imaging device, and the like installed and fixed to a building or a moving object such as a vehicle.

Hereinafter, the optical configuration of the imaging lens will be described in more detail.

(1) First Lens i) Object Side Surface

The first lens has a negative refractive power and its object side is a convex surface. Since the object side of the first lens is formed as the convex surface, it is possible to prevent the re-reflected light from entering the image plane when light entering the imaging lens is reflected in the image plane and the light enters the object side surface of the first lens. That is, since the object side surface of the first lens is formed as the convex surface, it is possible to prevent the occurrence of ghosts. Further, when the object side surface of the first lens is a concave surface, it is not preferable in that the light entering the imaging lens is totally reflected in the object side surface of the first lens and a desired angle of view cannot be obtained when the angle of the imaging lens becomes wide.

ii) Image Side Surface

The first lens has a negative refractive power and its object side is a convex surface. For that reason, the image side of the first lens is the concave surface as described above. Further, the object side of the second lens is a concave surface. Therefore, since the negative refractive power can be dispersedly allocated to the image side surface of the first lens and the object side surface of the second lens in order to obtain a predetermined angle of view without allocating a strong negative refractive power only to the first lens, it is possible to obtain the imaging lens having high imaging performance by preventing the occurrence of various aberrations.

iii) Aspherical Surface

It is preferable that at least one surface of the first lens is an aspherical surface. Since at least the object side surface or the image side surface is the aspherical surface, it is easy to secure good imaging performance with a small number of lenses. Further, good imaging performance is easily secured in both the vicinity and the periphery of the optical axis and field curvature is easily corrected.

The above-described effect can be obtained when at least one surface of the first lens is an aspherical surface, but from the viewpoint of realizing better imaging performance, it is preferable that both surfaces of the first lens are aspherical surfaces. Further, since both surfaces of the first lens are the aspherical surfaces, the decentering amount of the first lens is easily measured. Additionally, the decentering amount means a difference in eccentric direction between the apex position of the object side surface of the first lens and the apex position of the image side surface of the first lens. That is, when an axis parallel to the optical axis is a z axis and a plane perpendicular to the z axis is an xy plane, the decentering amount of the first lens means a deviation amount in the apex position indicated by a difference in the x-axis direction and a difference in the y-axis direction of the apex positions of the object side surface and the image side surface. Since the decentering amount is easily measured, the quality of the first lens is easily managed and the occurrence of one-sided blur or decentering coma aberration caused by the decentering can be prevented.

(2) Second Lens

The object side of the second lens may be a concave surface and its refractive power may be positive or negative. For example, if the refractive power of the second lens is positive, the light flux diverged in the first lens can be converged not only in the air lens but also in the second lens. Thus, if the refractive power of the second lens is positive, the outer diameter of the first lens can be smaller than the outer diameter of the lens from the third lens while aiming for a wider angle. Then, when an appropriate positive refractive power is allocated to the second lens, the imaging lens can be further miniaturized with higher performance. Thus, when the imaging lens is applied to the imaging optical system of the in-vehicle imaging device, the in-vehicle imaging device can be further easily miniaturized and the presence of the in-vehicle imaging device is less visible from the outside (the object side) of the vehicle. Further, since the in-vehicle imaging device can be also installed in a narrower space in accordance with the further miniaturization thereof, the degree of freedom in the installation of the in-vehicle imaging device is increased.

(3) Third Lens

In the imaging lens, whether the refractive power allocated to the third lens is positive or negative or the shape of the lens surface is not particularly limited. For example, if the positive refractive power is allocated to the third lens, it is preferable in that the light flux entering from the second lens can be converged and the entire imaging lens can be miniaturized. On the other hand, chromatic aberration can be satisfactorily corrected when the negative refractive power is allocated to the third lens. However, in this case, is necessary to allocate a strong positive refractive power to the second lens in order to miniaturize the imaging lens. In this case, since the decentering sensitivity of the second lens becomes high, at is not preferable in that the performance deterioration at the time of decentering becomes large. When the second lens has the positive refractive power, the positive refractive power can be dispersedly allocated to the second lens and the third lens by allocating the positive refractive power to the third lens. For that reason, since it is possible to prevent the decentering sensitivity of the second lens from becoming too high, it is preferable for improving the yield.

When a positive refractive power is allocated to the third lens, it is preferable that both surfaces of the third lens are convex surfaces. Since both surfaces of the third lens are the convex surfaces, the positive refractive power allocated to the third lens can be dispersedly allocated to both surfaces on the object side and the image side. For that reason, it is possible to prevent deterioration of various aberrations due to decentering even when a relatively strong positive refractive power is allocated to the third lens.

Further, it is preferable that at least one surface of the third lens is an a spherical surface. When at least, one of the object side surface and the image side surface is the aspherical surface, spherical aberration can be satisfactorily corrected and good imaging performance can be secured with a small number of lenses. Accordingly, a bright imaging lens can be obtained if both surfaces of the third lens are the aspherical surfaces, it is preferable for quality management due to the same reason as that of the first lens in addition to the benefit of realizing better imaging performance.

(4) Fourth Lens

In the imaging lens, whether the refractive power allocated to the fourth lens is positive or negative or the shape of the lens surface is not particularly limited. For example, if the positive refractive power is allocated to the fourth lens, it is preferable in that the light flux on the image side of the imaging lens can be further converged and the entire imaging lens can be miniaturized.

(5) Fifth Lens

In the imaging lens, whether the refractive power allocated to the fifth lens is positive or negative or the shape of the lens surface is not particularly limited. Here, it is preferable that the refractive power of the fifth lens has a sign opposite to that of the fourth lens in order to satisfactorily correct chromatic aberration. For example, when the fourth lens has the positive refractive power, chromatic aberration can be satisfactorily corrected if the negative refractive power is allocated to the fifth lens. It is more preferable that the positive refractive power is allocated to the fourth lens and the negative refractive power is allocated to the fifth lens in order to more satisfactorily correct chromatic aberration.

Further, it is more preferable that the fourth lens and the fifth lens are cemented. If the fourth lens and the fifth lens are cemented and integrated, the array adjustment such as the optical axis alignment of the lenses when manufacturing the imaging lens is facilitated and the decentering sensitivity can be reduced. Further, it is preferable that the combined focal length of the cemented lens is negative when the fourth lens and the fifth lens are cemented. When the cemented lens has a divergence effect, it is possible to increase the effective image circle by bouncing the light ray to a desired image height while reducing the size of the imaging lens. That is, it is possible to use a larger image sensor having a large number of pixels while configuring the imaging lens to be small.

(6) Sixth Lens

In the imaging lens, whether the refractive power allocated to the sixth lens is positive or negative or the shape of the lens surface is not particularly limited. For example, when the image side of the sixth lens is formed as a surface having a curvature, it is possible to prevent the re-reflected light from entering the image plane when the light entering the imaging lens is reflected in the image plane and the light enters the image side surface of the sixth lens. That is, when the re-reflected light is allowed to enter the outside of the image plane, it is possible to prevent the occurrence of ghosts. In order to more effectively prevent the occurrence of ghosts, it is more preferable that the image side of the sixth lens is a convex surface and each of both surfaces of the sixth lens is a convex surface.

(7) Lens Glass Material

It is preferable that all of the first lens to the sixth lens constituting the imaging lens are glass lenses. Compared to plastic lenses, glass lenses have higher thermal stability and less expansion and contraction due to a change in ambient temperature. For that reason, when all lenses constituting the imaging lens are the glass lenses, it is possible to satisfactorily prevent a focus (focus position) variation and a field angle variation even when an ambient temperature changes.

(8) Diaphragm

In the imaging lens, the arrangement position of the diaphragm (aperture stop) is not particularly limited. However, when the diaphragm is disposed at an appropriate position, it is possible to obtain a bright imaging lens with a small F value while cutting unnecessary light at the peripheral image height. Here, the diaphragm defines the pupil position. In the imaging lens, the front lens diameter becomes smaller as the entrance pupil position becomes closer to the object side. On the other hand, the imaging lens becomes smaller as the exit pupil position becomes closer to the image plane. However, since the entrance angle of the image forming light with respect to the image plane becomes larger as the exit pupil position becomes closer to the image plane of the imaging lens, it is difficult to allow the light to properly enter a photodiode arranged in the image sensor. As a result, since it is difficult to secure proper exposure, uneven sensitivity (shading unevenness) and coloring around the area may occur. Thus, it is preferable that the diaphragm is disposed on the object side in relation to the fourth lens, more preferable that the diaphragm is disposed between the second lens and the fourth lens, and most preferable that the diaphragm is disposed between the second lens and the third lens from the viewpoint of being bright and preventing sensitivity unevenness, peripheral coloring, and the like.

1-2, Conditional Expression

It is preferable that the imaging lens adopts the above-described configuration and satisfies at least one or more conditional expressions to be described below.

1-2-1. Conditional Expression (1)

The imaging lens preferably satisfies the following conditions:

$$1.30 < R11/f < 10.0 \qquad (1)$$

where

R11 is the paraxial curvature radius of the object side surface of the first lens, and f is the focal length of the imaging lens.

Additionally, the sign of the paraxial curvature radius is positive (+) when the curvature center of the lens surface is on the image side with respect to the lens surface and is negative (−) when the curvature center is on the object side.

The conditional expression (1) above is an expression that defines a ratio of the paraxial curvature radius R11 of the object side surface of the first lens with respect to the focal length f of the entire imaging lens system. In the imaging lens, the object side of the first lens is a convex surface. At this time, when the conditional expression (1) is satisfied, the curvature of the object side surface of the first lens falls within an appropriate range. Accordingly, when the light entering the imaging lens is reflected in the image plane and the light enters the object side surface of the first lens, it is possible to more effectively prevent the re-reflected light from entering the image plane and to satisfactorily prevent the occurrence of ghosts. Further, when the conditional expression (1) is satisfied, it is possible to increase the angular resolution near the optical axis as compared with the surroundings and to display the object near the optical axis to be larger than the surrounding objects. Additionally, as described above, the "number of pixels on the image sensor (image sensor) per each degree of the field angle of view" is defined as "angular resolution". Further, the vicinity of the optical axis means the range of about 40% of the image height including the center of the optical axis. That is, it is possible to realize an imaging lens with a wide angle of view capable of forming an image of an object near an optical axis with a high resolution by satisfying the conditional expression (1). Thus, when the imaging lens is applied to the imaging optical system of the sensing camera and the forward direction of the vehicle is sensed, it is possible to accurately detect a far object such as a preceding vehicle while widely recognizing objects (obstacles, traffic lights, road traffic signs, and the like) around the vehicle.

In contrast, when the numerical value of the conditional expression (1) becomes the upper limit value or more, the curvature of the object side surface of the first lens is gentle and the occurrence of ghosts is not effectively and easily prevented. Further, in this case, when it is attempted to maintain the angular resolution required to acquire a far object with a high resolution, the angle of view becomes narrower than in the case where the conditional expression (1) is satisfied. Thus, when priority is given to forming an image of a far object with a high resolution by the imaging lens, it is not preferable in that a wide angle of view is not easily achieved.

On the other hand, when the numerical value of the conditional expression (1) becomes the lower limit value or less, the curvature of the object side surface of the first lens is tight and the angular resolution near the optical axis can be easily increased compared to the peripheral area. However, when the paraxial curvature radius of the object side surface of the first lens becomes the upper limit value or more, various aberrations such as coma aberration or field curvature also increase so that the distortion increases. For that reason, it is not preferable in that good optical performance is not easily secured.

In order to obtain the above-described effects, the upper limit value of the conditional expression (1) is preferably 7.5 and more preferably 5.0. Further, the lower limit value of the conditional expression (2) is preferably 1.32 and more preferably 1.35. Additionally, regarding the preferable numerical condition of the conditional expression (1), the inequality sign (<) in the conditional expression (1) may be replaced with an inequality sign with an equal sign ($\leq$). The same applies to other conditional expressions to be described below. Here, when the lower limit value and/or the upper limit value is represented by an inequality sign with an equal sign ($\leq$) in other conditional expressions, the inequality sign with an equal sign ($\leq$) may be replaced with an inequality sign (<) with respect to preferable numerical conditions.

1-2-2. Conditional Expression (2)

It is preferable that the imaging lens satisfies the following condition:

$$0.05 < D1/f < 0.50 \tag{2}$$

where

D1 is the thickness of the first lens on the optical axis.

The conditional expression (2) is an expression that defines a ratio between the thickness on the optical axis of the first lens (the gap on the optical axis between the object side surface and the image side surface of the first lens) and the focal length of the imaging lens. In the imaging lens with the above-described configuration, when the conditional expression (2) is satisfied, it is possible to prevent the occurrence of various aberrations while maintaining the imaging lens in a small size and to obtain the imaging lens having a good imaging performance.

In contrast, when the numerical value of the conditional expression (2) becomes the lower limit value or less, it is not preferable in that sufficient durability cannot be secured. That is, when the numerical value of the conditional expression (2) becomes the lower limit value or less, the thickness of the first lens becomes too thin. Accordingly, it is not preferable in that the lens may be broken depending on the magnitude of the impact when a large impact is applied.

On the other hand, when the numerical value of the conditional expression (2) becomes the upper limit value or more, since the thickness of the first lens is secured, the refractive power of the first lens can be reasonably strengthened and the angular resolution near the optical axis can be easily larger than that of the peripheral area. However, when the thickness of the first lens becomes too thick, it is not preferable in that the miniaturization of the imaging lens is difficult.

In order to obtain the above-described effects, the upper limit value of the conditional expression (2) is preferably 0.45, more preferably 0.40, and further preferably 0.35. Further, the lower limit value of the conditional expression (2) is preferably 0.08 and more preferably 0.10.

1-2-3. Conditional Expression (3)

The imaging lens preferably satisfies the following conditions:

$$-1.5 < f1/f < -0.8 \tag{3}$$

where f1 is the focal length of the first lens.

The conditional expression (3) is an expression that defines a ratio between the focal length of the first lens and the focal length of the imaging lens. When the conditional expression (3) is satisfied, since the refractive power of the first lens falls within an appropriate range, the outer diameter of the first lens can be maintained in a small size and good imaging performance can be obtained. Accordingly, it is possible to perform accurate sensing even for a short-distance object image acquired in a wide range.

In contrast, when the numerical value of the conditional expression (3) becomes the upper limit value or more, the refractive power of the first lens becomes weaker. Accordingly, since the outer diameter of the first lens needs to be large in order to increase the aperture and maintain good imaging performance, it is not preferable for miniaturizing the imaging lens. On the other hand, when the numerical value of the conditional expression (3) becomes the lower limit value or less, since the refractive power of the first lens is strong, it is preferable for miniaturizing the outer diameter of the first lens. However, in this case, various aberrations such as field curvature are not easily corrected and the optical performance of the imaging lens is deteriorated. For that reason, it is not preferable in that accurate sensing is difficult.

In order to obtain the above-described effects, the upper limit value of the conditional expression (3) is preferably −1.0 and more preferably −1.1. Further, the lower limit value of the conditional expression (3) is preferably −1.4 and more preferably −1.3.

1-2-4. Conditional Expression (4)

The imaging lens preferably satisfies the following conditions:

$$0.2 < d_{1-2}/f < 1.5 \tag{4}$$

where $d_{1-2}$ is the air distance on the optical axis between the first lens and the second lens.

The conditional expression (4) is an expression that defines a ratio between the air distance on the optical axis between the first lens and the second lens and the focal length of the imaging lens. The value of "$d_{1-2}$" corresponds to the thickness (the gap between the surfaces) of the air lens formed between the first lens and the second lens. In the imaging lens, the first lens having the negative refractive power is disposed closest to the object side. When the conditional expression (4) is satisfied, various aberrations can be satisfactorily corrected by the air lens formed between the first lens and the second lens and an imaging lens having high imaging performance can be obtained. Further, when the conditional expression (4) is satisfied, the air distance on the optical axis between the first lens and the second lens falls within an appropriate range and the light flux diverged in the first lens can enter the second lens before its diameter increases too much. For that reason, the miniaturization of the imaging lens is more facilitated.

In contrast, when the numerical value of the conditional expression (4) becomes the upper limit value or more, since the air distance on the optical axis becomes wider with respect to the focal length of the entire imaging lens system, the outer diameter of the second lens needs to be larger and the total optical length also becomes longer. For that reason, it is not preferable for miniaturizing the imaging lens. On the other hand, when the numerical value of the conditional expression (4) becomes the lower limit value or less, since the air distance on the optical axis between the first lens and the second lens becomes narrower with respect to the focal length of the entire imaging lens system, various aberrations are not easily corrected by the air lens formed between the first lens and the second lens and good imaging performance cannot be obtained.

In order to obtain the above-described effects, the upper limit value of the conditional expression (4) is preferably 1.2, more preferably 1.0, and further preferably 0.9. Further, the lower limit value of the conditional expression (4) is preferably 0.25 and more preferably 0.3.

1-2-5. Conditional Expression (5)

The imaging lens preferably satisfies the following conditions:

$$2.0 < f2/f < 10.0 \quad (5)$$

where f2 is the focal length of the second lens.

The conditional expression (5) is an expression that defines a ratio between the focal length of the second lens and the focal length of the imaging lens. When the conditional expression (5) is satisfied, the second lens has a positive refractive power. For that reason, as described above, the light flux diverged in the first lens can be converged to the second lens and the outer diameter of the first lens can be easily smaller than the outer diameter of the lens from the third lens while aiming for a wider angle. Further, when the conditional expression is satisfied, the positive refractive power allocated to the second lens falls within an appropriate range and the imaging lens can be easily miniaturized while preventing the occurrence of coma aberration or field curvature.

In contrast, when the numerical value of the conditional expression (5) becomes the upper limit value or more, the positive refractive power allocated to the second lens is weak and the light flux entering from the first lens is not easily and sufficiently converged to the second lens. For that reason, the outer diameter of the lens disposed on the image side in relation to the second lens increases. Further, the air distance on the optical axis between the second lens and the third lens becomes larger and the total optical length also becomes longer. Therefore, it is difficult to miniaturize the imaging lens.

On the other hand, when the numerical value of the conditional expression (5) becomes the lower limit value or less, the refractive power of the second lens becomes stronger and the effect in which the light flux entering from the first lens is converged to the second lens becomes stronger. For that reason, is preferable for miniaturizing the imaging lens. However, when the refractive power of the second lens becomes too strong, it is not preferable in that the occurrence of coma aberration or field curvature is not easily prevented even when the shapes of the object side surface and the image side surface of the second lens are adjusted.

In order to obtain the above-described effects, the upper limit value of the conditional expression (5) is preferably 8.0, more preferably 7.0, and further preferably 6.0, and still further preferably 5.5. Further, the lower limit value of the conditional expression (5) is preferably 3.0, more preferably 3.5, and further preferably 4.0.

1-2-6. Conditional Expression (6)

The imaging lens preferably satisfies the following conditions:

$$1.0 < f3/f < 5.0 \quad (6)$$

where f3 is the focal length of the third lens.

The conditional expression (6) is an expression that defines a ratio between the focal length of the third lens and the focal length of the imaging lens. When the conditional expression (6) is satisfied, better imaging performance can be obtained and the outer diameter of each of the lenses arranged from the third lens can be smaller, so that the imaging lens can be further miniaturized.

At this time, it is more preferable that both surfaces of the third lens are convex surfaces. When both surfaces of the third lens are the convex surfaces, since the refractive power satisfying the conditional expression (6) above can be dispersedly allocated to both surfaces of the third lens, the occurrence of spherical aberration is prevented and better imaging performance can be obtained.

In contrast, when the numerical value of the conditional expression (6) becomes the upper limit value or more, the positive refractive power allocated to the third lens becomes weaker, so that the total optical length also becomes longer. For that reason, it is difficult to miniaturize the imaging lens. On the other hand, when the numerical value of the conditional expression (6) becomes the lower limit value or less, the positive refractive power allocated to the third lens becomes stronger. Accordingly, it is not preferable in that the occurrence of spherical aberration is not easily prevented even when the shapes of the object side surface and the image side surface of the third lens are adjusted.

In order to obtain the above-described effects, the upper limit value of the conditional expression (6) is preferably 4.0, more preferably 3.5, further preferably 3.0, and still further preferably 2.8. Further, the lower limit value of the conditional expression (6) is preferably 1.2 and more preferably 1.4.

1-2-7. Conditional Expression (7)

The imaging lens preferably satisfies the following conditions:

$$1.0 < f6/f < 5.0 \quad (7)$$

where f6 is the focal length of the sixth lens.

The conditional expression (7) is an expression that defines a ratio between the focal length of the sixth lens and the focal length of the imaging lens. When the conditional expression (7) is satisfied, better imaging performance can be obtained and the outer diameter of the sixth lens can be made smaller, so that the imaging lens can be further miniaturized.

In contrast, when the numerical value of the conditional expression (7) becomes the upper limit value or more, the positive refractive power allocated to the sixth lens becomes weaker and the outer diameter of the sixth lens becomes larger, so that it is difficult to miniaturize the imaging lens. On the other hand, the numerical value of the conditional expression (7) becomes the lower limit value or less, the positive refractive power allocated to the sixth lens becomes stronger. In this case, it is not preferable in that field curvature occurring in the first lens is not easily corrected by the sixth lens and good imaging performance is not easily obtained.

In order to obtain the above-described effects, the upper limit value of the conditional expression (7) is preferably 4.5, more preferably 4.0, and further preferably 3.5. Further, the lower limit value of the conditional expression (7) is preferably 1.5 and more preferably 2.0.

1-2-8. Conditional Expression (8)

The imaging lens preferably satisfies the following conditions:

$$50 < v_{3,6} \tag{8}$$

where $v_{3,6}$ is the average Abbe number for d lines (587.56 mm) of the third lens and the sixth lens.

Additionally, when $v_3$ indicates the Abbe number of the third lens and $v_6$ indicates the Abbe number of the sixth lens, "$v_{3,6} = (v_3 + v_6)/2$" is expressed.

The conditional expression (8) is an expression that defines the average Abbe number for the d lines (587.56 mm) of the third lens and the sixth lens. When the conditional expression (8) is satisfied, since the dispersion of the third lens and the sixth lens is small, an imaging lens having good chromatic aberration can be obtained. Further, when the conditional expression (8) is satisfied, it means that the third lens and the sixth lens are formed of a glass material having a small change in the refractive index when an ambient temperature changes or a glass material having a negative value of a change in the refractive index (dn/dT) when an ambient temperature changes. For that reason, when the third lens and the sixth lens satisfy the corresponding condition, it is possible to obtain the imaging lens that has a small focus variation and a small field angle variation even when an ambient temperature changes and has good imaging performance for a long period of time not only at a room temperature but also in a high temperature environment and a low temperature environment.

In contrast, when the numerical value of the conditional expression (8) becomes the lower limit value or less, the average Abbe number of the third lens and the sixth lens becomes small and the dispersion becomes large. For that reason, since a focus variation or a field angle variation is caused when an ambient temperature changes depending on the glass material in addition to the difficult correction of chromatic aberration, it is not preferable in that good imaging performance is not easily maintained for a long period of time when the imaging lens is used in an environment in which an ambient temperature changes largely.

Since the conditional expression (8) is an expression that defines the average Abbe number of the third lens and the sixth lens as described above, the above-described effect can be obtained when the average Abbe number of the third lens and the sixth lens is larger than the lower limit value and the upper limit value thereof does not need to be particularly provided. However, a glass material having a small dispersion, that is, a glass material having a large Abbe number is generally expensive. Thus, when considering the above-described effects and economic balance, the upper limit value of the conditional expression (8) is preferably 80 and more preferably 70. Further, the lower limit value of the conditional expression (8) is preferably 52, more preferably 54, further preferably 56, and still further preferably 60.

1-2-9. Conditional Expression (9)

The imaging lens preferably satisfies the following conditions:

$$45° < \theta \tag{9}$$

where $\theta$ is the half angle of view ($\omega$) of the imaging lens.

The conditional expression (9) is an expression that defines the half angle of view of the imaging lens. When the conditional expression (9) is satisfied, it is possible to realize an imaging lens with high angular resolution near the paraxial axis while securing a relatively wide angle of view. For that reason, a far object can be imaged with a high resolution and an imaging lens with a wide angle of view can be realized compared to an imaging lens having substantially the same focal length. For that reason, when the imaging lens is applied to the imaging optical system of the sensing camera and the forward direction of the vehicle is sensed, it is possible to accurately detect a far object such as a preceding vehicle while widely recognizing objects (obstacles, traffic lights, road traffic signs, and the like) around the vehicle.

When the numerical value of the conditional expression (9) becomes the lower limit value, the angle of view becomes narrow. For that reason, it is preferable for imaging a far object with a high resolution, but it is difficult to image a wide range. Thus, it is not preferable in that objects (obstacles, traffic lights, road traffic signs, and the like) around the vehicle are not easily and widely recognized when the imaging lens is applied to the imaging optical system of the sensing camera.

As the numerical value of the conditional expression (9) above becomes smaller, the angle of view becomes wider and the imageable range becomes wider. Front that viewpoint, the lower limit value of the conditional expression (9) is preferably 50° and more preferably 55°. On the other hand, the upper limit value does not need to be particularly specified from the viewpoint of realizing an imaging lens having a wide imageable range. However, the maximum value of the half angle of view is 90°. Thus, the upper limit value s required to be 90°. Further, since the distortion increases when the half angle of view becomes too large, it is difficult to recognize an object reflected in the peripheral area. Thus, the upper limit value of the conditional expression (9) is preferably 85° or less and more preferably 80° or less from the viewpoint of satisfactorily recognizing an object when the imaging lens is used as the imaging optical system of the sensing camera.

1-2-10. Conditional Expression (10)

The imaging lens preferably satisfies the following conditions:

$$EN/f < 1.5 \tag{10}$$

where

EN is the distance on the optical axis between the object side surface of the first lens and the entrance pupil position of the imaging lens.

The conditional expression (10) is an expression that defines a ratio between the distance on the optical axis between the object side surface of the first lens and the entrance pupil position of the imaging lens and the focal length of the imaging lens. When the conditional expression (10) is satisfied, it is possible to maintain good imaging performance while achieving a small outer diameter of the first lens and a small size of the entire imaging lens by decreasing the effective diameter of the first lens.

In contrast, when the numerical value of the conditional expression (10) becomes the upper limit value or more, since the entrance pupil position is separated from the object side, it is preferable for correcting various aberrations. However, when the entrance pupil position is in the vicinity of the image plane, it is difficult to decrease the effective diameter of the first lens and to miniaturize the imaging lens.

In order to obtain the above-described effects, the upper limit value of the conditional expression (10) is preferably 1.2 and more preferably 1.0. Here, it is advantageous that the effective diameter of the first lens becomes smaller as the numerical value of the conditional expression (10) becomes smaller. However, when the numerical value of the conditional expression (10) becomes too small, it is difficult to correct distortion aberration, coma aberration, or the like. Here, the lower limit value of the conditional expression (10) is preferably larger than 0, more preferably 0.2, and further preferably 0.4 to achieve higher optical performance.

1-2-11. Conditional Expression (11)

The imaging lens also preferably satisfies the following conditions:

$$f/(4 \times YS1) \leq 1.0 \quad (11)$$

where

YS1 is the upper light ray maximum height of the light ray on axis of the object side surface of the first lens.

When the conditional expression (11) is satisfied, a bright large-aperture imaging lens having F value of 2.0 or less is obtained. For that reason, a clear subject image can be acquired even in a dark environment such as at night. For that reason, when the imaging lens is applied to the imaging optical system of the sensing camera, good long-distance sensing and short-distance sensing can be realized regardless of day or night.

It is possible to realize a bright imaging lens of which F value is small as the numerical value of the conditional expression (11) becomes smaller. Thus, the upper limit value of the conditional expression is preferably 0.9 and more preferably 0.8. The lower limit value does not need to be particularly specified, but is preferably about 0.5 or may be about 0.6.

1-2-12. Conditional Expression (12)

The imaging lens also preferably satisfies the following conditions:

$$(Y\max - f \times \tan\theta)/(f \times \tan\theta) < -0.3 \quad (12)$$

where

Ymax is the image height of the effective image circle, and

θ is the half angle of view (ω) of the imaging lens.

When the conditional expression (12) is satisfied, large negative distortion can be generated compared to the normal imaging lens and an imaging lens with high angular resolution near the paraxial axis can be realized while securing a wide angle of view.

It is preferable for obtaining the above-described effects since the negative distortion increases as the numerical value of the conditional expression (12) decreases. From that viewpoint, the upper limit value of the conditional expression (12) is more preferably −0.35 and further preferably −0.40. However, since the distortion increases when the negative distortion increases, it is difficult to recognize an object reflected in the peripheral area. Thus, the lower limit value of the conditional expression (12) is more preferably −0.70 and further preferably −0.60 from the viewpoint of satisfactorily recognizing an object when the imaging lens is used as the imaging optical system of the sensing camera.

1-2-13. Conditional Expression (13)

In the imaging lens, it is preferable that the following conditions are satisfied when the fourth lens has the positive refractive power and the fifth lens has the negative refractive power:

$$-10.0 < f45/f < -1.0 \quad (13)$$

where f45 is the combined focal length of the fourth lens and the fifth lens.

The conditional expression (13) is an expression that defines a ratio between the combined focal length of the fourth lens and the fifth lens and the focal length of the imaging lens. Here, it is more preferable that the fourth lens and the fifth lens are cemented.

When the conditional expression (13) is satisfied, it is possible to satisfactorily correct various aberrations while preventing an increase in the total optical length of the imaging lens and to more easily realize an imaging lens having high optical performance.

In contrast, when the numerical value of the conditional expression (13) becomes the upper limit value or more, the combined refractive power of the fourth lens and the fifth lens is too strong and the correction of field curvature is difficult. For that reason, it is difficult to obtain good optical performance. On the other hand, when the numerical value of the conditional expression (13) becomes the lower limit value or less, the combined refractive power of the fourth lens and the fifth lens is weak and the divergence effect of the entering light flux is weakened. For that reason, since it is necessary to increase the length of the entire optical system in order to secure a desired image height, it is difficult to miniaturize the optical system.

In order to obtain the above-described effects, the upper limit value of the conditional expression (13) is more preferably −1.5 and further preferably −2.0. Further, the lower limit value of the conditional expression (13) is more preferably −9.0 and further preferably −8.0.

1-2-14. Conditional Expression (14)

In the imaging lens, it is preferable that the following conditional expression (14) is satisfied by cementing the fourth lens and the fifth lens to each other:

$$0 = |\alpha 4 - \alpha 5| < 50 \times 10^{-7} \quad (14)$$

where

α4 is the average linear expansion coefficient ($1 \times 10^{-7}$/K) from −30° C. to 70° C. of the glass material forming the fourth lens, and α5 is the average linear expansion coefficient ($1 \times 10^{-7}$/K) from −30° C. to 70° C. of the glass material forming the fifth lens.

The conditional expression (14) is an expression that defines a difference between the average linear expansion coefficient of the glass material forming the fourth lens and the average linear expansion coefficient of the glass material forming the fifth lens. The glass material expands and contracts in accordance with a change in ambient temperature. When the conditional expression (14) is satisfied, both glass materials have the same expansion and contraction amount with respect to a change in ambient temperature. Thus, since both glass materials expand and contract by the same amount even when an ambient temperature changes between −30° C. and 70° C., the separation at the cemented portion of both lenses can be prevented. Thus, even when the imaging lens is applied an imaging optical system of an in-vehicle imaging device or the like in a severe change in ambient temperature, the cementing of the fourth lens and the fifth lens can be maintained and an imaging lens with high temperature resistance can be realized.

In order to obtain the above-described effects, the upper limit value of the conditional expression (14) is preferably $42 \times 10^{-7}$, more preferably $36 \times 10^{-7}$, further preferably $30 \times 10^{-7}$, still further preferably $20 \times 10^{-7}$, and still further preferably $10 \times 10^{-7}$.

2. Imaging Device

Next, an imaging device according to the present invention will be described. The imaging device according to the present invention includes the imaging lens according to the present invention and an image sensor which receives an optical image formed by the imaging lens and coverts the optical image into an electric image signal.

Here, the image sensor is not particularly limited to the image sensor or the like and a solid-state image sensor such as a CCD sensor (Charge Coupled Device) or a CMOS sensor (Complementary Metal Oxide Semiconductor) can be also used. The imaging device according to the present invention is suitable for an imaging device using a solid-state image sensor such as a digital camera or a video camera. Further, the imaging device may be a lens fixed type imaging device in which a lens is fixed to a housing or may be a lens replacement type imaging device such as a single lens reflex camera or a mirrorless camera.

The imaging device according to the present invention can be used as a stationary fixed imaging device such as an in-vehicle imaging device installed and fixed to a vehicle, a building, or the like for a specific purpose such as a monitoring or sensing operation in addition to a general imaging device used to image a subject for viewing purposes. The imaging lens according to the present invention is a lens capable of forming an image of an object near an optical axis at a high resolution and having a wide angle of view while having a small size as a whole. For that reason, a far object can be imaged with a high resolution and a wide range can be imaged. Further, since a so-called front lens diameter can be reduced, the presence of the imaging device is not easily visible from the outside of the vehicle or the like, an object located at a far position can be imaged by one imaging device, and the periphery can be imaged in a wide range. Thus, the imaging device is suitable for an in-vehicle imaging device or the like and is particularly suitable for a sensing camera mounted on various moving objects (land moving objects, air moving objects, and sea moving objects) and detecting or recognizing the forward direction and the peripheral object of the moving objects. Additionally, examples of the moving objects include an unmanned aerial vehicle (drone or the like) or an unmanned explorer and a robot (including a cleaning robot or the like) having a self-sustained moving function such as a self-standing biped robot in addition to vehicles such as automobiles, airplanes, and ships.

Next, the present invention will be described in detail by exemplifying embodiments. However, the present invention is not limited to the embodiments below. The imaging lenses of the embodiments exemplified below are imaging lenses used in imaging devices (optical devices) such as digital cameras, video cameras, and silver salt film cameras and can be particularly preferably used in an in-vehicle imaging device or the like and preferably used in a sensing camera mounted on various moving objects. Further, in each lens cross-sectional view, the left side of the drawing is the object side and the right side of the drawing is the image side First Embodiment (1) Optical Configuration of Imaging Lens FIG. 1 is a lens cross-sectional view showing a configuration of an imaging lens of a first embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a cemented lens obtained by cementing a fourth lens G4 having a positive refractive power and having a convex surface on an image side and a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens G1 and both surfaces of the third lens G3 is an aspherical surface.

Additionally, "IP" of the drawing indicates the image plane. The image plane is an imaging plane of a solid-state image sensor such as a CCD sensor or a CMOS sensor described above. Light entering from the object side of the imaging lens forms an image on the image plane. The solid-state image sensor converts a received optical image into an electric image signal. An image processing unit (an image processor or the like) of an imaging device or the like generates a digital image corresponding to an image of a subject on the basis of the electric image signal output from the image sensor. The digital image can be stored on, for example, a storage medium such as a Hard Disk Device (HDD), a memory card, an optical disk, and a magnetic tape. Additionally, the image plane may be a film surface of a silver salt film.

Further, "G" shown on the object side of the image plane IP is an optical block. The optical block G corresponds to an optical filter, a face plate, a crystal low-pass filter, an infrared cut filter, or the like. Since these reference numerals (IP, G) indicate the same in each drawing shown in other embodiments, the description thereof will be omitted below.

(2) Numerical Example

A numerical example which adopts a detailed numerical value of the imaging lens employed in the first embodiment will be described. Table 1 shows lens data of the imaging lens. In Table 1, "surface number" indicates the lens surface number counted from the object side, "r" indicates the curvature radius of the lens surface (here, a surface an which a value of r is INF indicates that the surface is a flat surface), "d" indicates a gap between the i-th lens surface (i is a natural number) from the object side and the (i+1)-th lens surface on the optical axis, "nd" indicates the refractive index for the d line (wavelength λ=587.56 nm), and "vd" indicates the Abbe number for the d line. Here, when the lens surface is aspherical, "✱" is added before the surface number in the table. In the case of an aspherical surface, the paraxial radius of curvature is shown in the "r" column.

Table 2 shows various data of the imaging lens. Specifically, the focal length (mm), F value, half angle of view (°), image height (mm), total lens length (mm), and back focus (BF (in air)) (mm) of the imaging lens are shown. Here, the total lens length is a value obtained by adding the back focus to the distance on the optical axis from the object side surface of the first lens to the image side surface of the n-th lens closest to the image side, here, the sixth lens G6. Further, the back focus is an air-converted value of the distance from the image side surface of the n-th lens to the paraxial image surface.

Table 3 shows aspherical data. As aspherical surface data, the aspherical surface coefficient when the shape is defined by the following expression is shown for the aspherical surface shown in Table 1. Additionally, the aspherical surface coefficient can be expressed by the following aspherical surface expression with the displacement in the optical axis direction at the position of the height h from the optical axis as the apex reference.

$$z = ch^2/[1+\{1-(1+k)c^2h^2\}^{1/2}]+A4h^4+A6h^6+A8h^8+A10h^{10}$$

Here, c is the curvature (1/r), h is the height from the optical axis, k is the conical coefficient (conic constant), and A4, A6, A8, A10 . . . are aspherical coefficients of each order. Further, the notation of "E±m" (m represents an integer) in the numerical values of the aspherical surface coefficient and the conic constant means "×10$^{±m}$".

Table 4 shows the average linear expansion coefficient (unit 1×10$^{-7}$/K (1e-7/K)) at −30° C. to 70° C. of the glass materials forming the fourth lens and the fifth lens.

Further, Table 25 shows numerical values of each conditional expression of the imaging lens. Since items relating to these tables are the same in the tables shown in the other embodiments, the description thereof is omitted below.

to these longitudinal aberration diagrams are the same in the longitudinal aberration diagrams shown in the other embodiments, the description thereof is omitted below.

TABLE 1

| Surface number | r | d | nd | vd |
|---|---|---|---|---|
| *1 | 12.632 | 1.000 | 1.8478 | 40.12 |
| *2 | 3.634 | 2.662 | | |
| 3 | −14.900 | 4.640 | 1.7521 | 25.05 |
| 4 | −9.730 | 0.150 | | |
| 5 (Diaphragm) | INF | 3.044 | | |
| *6 | 21.297 | 3.220 | 1.5925 | 66.92 |
| *7 | −7.662 | 0.150 | | |
| 8 | 40.750 | 3.040 | 1.6030 | 65.46 |
| 9 | −8.400 | 0.700 | 1.7618 | 26.61 |
| 10 | 15.530 | 0.150 | | |
| 11 | 12.050 | 3.140 | 1.6180 | 63.41 |
| 12 | −36.500 | 1.900 | | |
| 13 | INF | 0.900 | 1.5163 | 64.15 |
| 14 | INF | 5.303 | | |

TABLE 2

| Focal length | 5.3295 (mm) |
|---|---|
| F value | 1.6 |
| Half angle of view | 59.19 (°) |
| Image height | 4.46 (mm) |
| Total lens length | 30 (mm) |
| BF (in air) | 7.785 (mm) |

TABLE 3

| Surface number | k | A4 | A6 | A8 | A10 |
|---|---|---|---|---|---|
| 1 | −2.1882E−01 | −2.3791E−03 | 1.0054E−04 | −3.9881E−06 | 7.4205E−08 |
| 2 | −1.0526E+00 | −5.8081E−04 | 2.2769E−04 | −1.3098E−05 | 4.9203E−07 |
| 6 | 0.0000E+00 | −9.2597E−05 | −8.1720E−06 | 5.5678E−07 | −1.7474E−08 |
| 7 | 0.0000E+00 | 3.0574E−04 | −5.8183E−06 | 4.9641E−07 | −1.3388E−08 |

Figure 2:
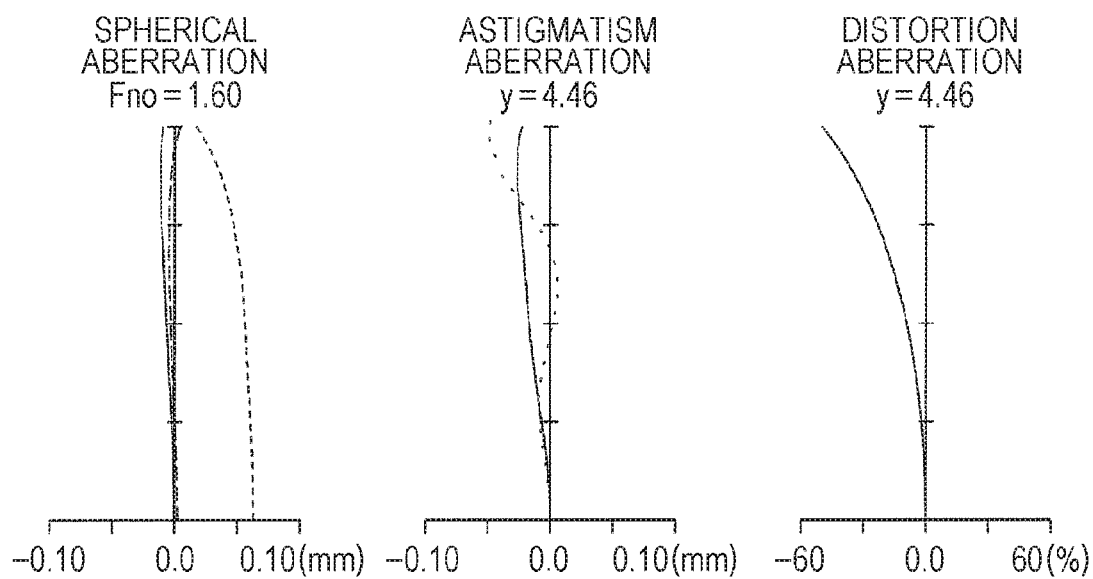
FIG. 2 shows a spherical aberration diagram, an astigmatism aberration diagram, and a distortion aberration diagram when the imaging lens of the first embodiment is focused at infinity.

FIG. 2 shows a longitudinal aberration diagram of the imaging lens when focused at infinity. The longitudinal aberration diagram shown in FIG. 2 shows spherical aberration (mm), astigmatism aberration (mm), and distortion aberration (%) in order from the left side of the drawing. In the drawing showing spherical aberration, the vertical axis represents the open F value (Fno). The solid line shows the spherical aberration at the d line (wavelength 587.56 nm), the long dashed line shows the spherical aberration at the C line (wavelength 656.27 nm), and the short dashed line shows the spherical aberration at the g line (wavelength 435.84 nm).

In the diagram showing astigmatism aberration, the vertical axis represents the image height (y). The solid line shows the sagittal direction at the d line (wavelength 587.56 nm) and the dashed line shows the meridional direction at the d line.

In the drawing showing the distortion aberration, the vertical axis represents the image height (y) and the distortion aberration (distortion) at the d line (wavelength 587.56 nm) is shown. As shown in FIG. 2, the imaging lens has large negative distortion aberration. Since the items relating

TABLE 4

| Fourth lens | 93 (1e-7/K) |
|---|---|
| Fifth lens | 84 (1e-7/K) |

Second Embodiment (1) Optical Configuration of Imaging Lens

Figure 3:
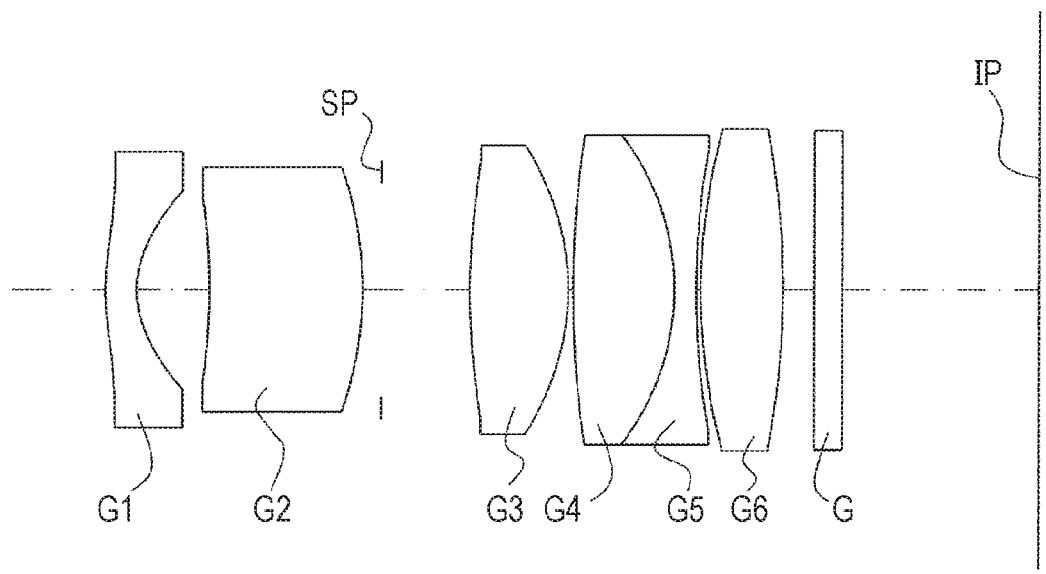
FIG. 3 is a cross-sectional view showing a lens configuration example of an imaging lens of a second embodiment of the present invention.

FIG. 3 is a lens cross-sectional view showing a configuration of an imaging lens of a second embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a cemented lens obtained by cementing a fourth lens G4 having a positive refractive power and having a convex surface on an image side and a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens G1 and both surfaces of the third lens G3 is an aspherical surface.

(2) Numerical Example

Figure 4:
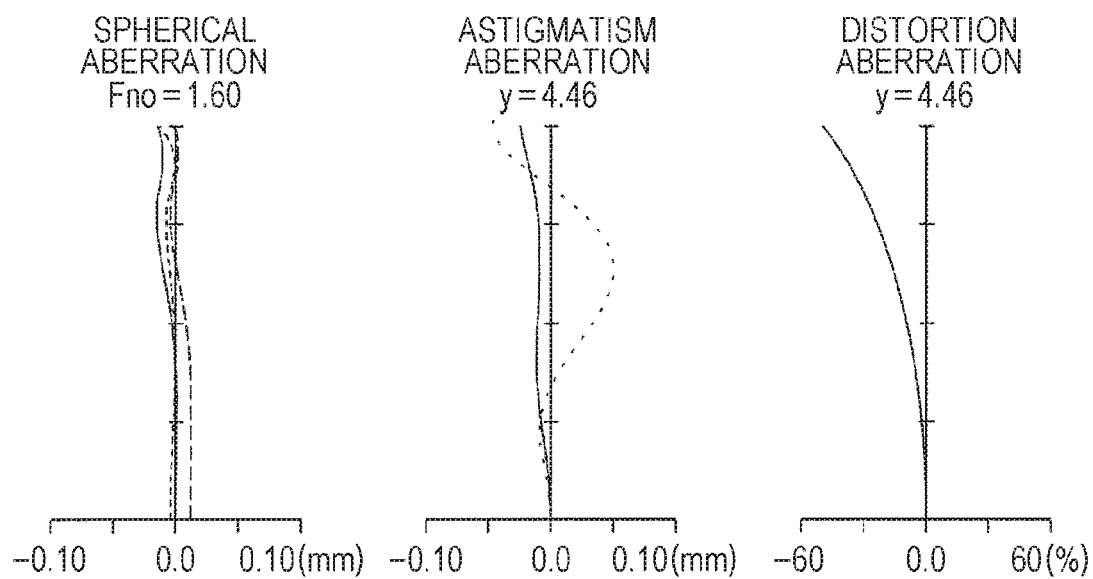
FIG. 4 shows a spherical aberration diagram, an astigmatism aberration diagram, and a distortion aberration diagram when the imaging lens of the second embodiment is focused at infinity.

Next, a numerical example which adopts a detailed numerical value of the imaging lens employed in the second embodiment will be described. Tables 5 to 8 respectively show lens data of the imaging lens, various data of the imaging lens, aspherical data, and average linear expansion coefficients (unit: $1 \times 10^{-7}$/K) of glass materials forming the fourth lens and the fifth lens at −30° C. to 70° C. Further, Table 25 shows numerical values of each conditional expression of the imaging lens. Further, FIG. 4 shows a longitudinal aberration diagram of the imaging lens when focused at infinity.

TABLE 5

| Surface number | r | d | nd | vd |
|---|---|---|---|---|
| *1 | 7.780 | 1.000 | 1.8411 | 40.04 |
| *2 | 2.943 | 2.333 | | |
| 3 | −21.774 | 4.930 | 1.8081 | 22.76 |
| 4 | −11.651 | 0.608 | | |
| 5 (Diaphragm) | INF | 2.848 | | |
| *6 | 22.292 | 3.160 | 1.5920 | 67.02 |
| *7 | −7.880 | 0.150 | | |
| 8 | 33.098 | 3.250 | 1.6030 | 65.46 |
| 9 | −8.000 | 0.700 | 1.7618 | 26.61 |
| 10 | 26.023 | 0.150 | | |
| 11 | 19.336 | 2.650 | 1.6180 | 63.41 |
| 12 | −26.047 | 1.000 | | |
| 13 | INF | 0.900 | 1.5163 | 64.15 |
| 14 | INF | 6.321 | | |

TABLE 6

| | |
|---|---|
| Focal length | 5.3345 (mm) |
| F value | 1.6 |
| Half angle of view | 59.07 (°) |
| Image height | 4.46 (mm) |
| Total lens length | 30 (mm) |
| BF (in air) | 7.903 (mm) |

TABLE 7

| Surface number | k | A4 | A6 | A8 | A10 |
|---|---|---|---|---|---|
| 1 | −1.5057E+00 | −5.6702E−03 | 3.1030E−04 | −1.0347E−05 | 1.5386E−07 |
| 2 | −2.7781E+00 | 2.6087E−03 | −1.6268E−04 | 2.1555E−05 | −7.3796E−07 |
| 6 | 0.0000E+00 | −9.8803E−05 | −3.2297E−06 | 1.9857E−07 | 8.7236E−09 |
| 7 | 0.0000E+00 | 2.6671E−04 | −6.0984E−06 | 4.9488E−07 | −1.3612E−08 |

TABLE 8

| | |
|---|---|
| Fourth lens | 93 (1e-7/K) |
| Fifth lens | 84 (1e-7/K) |

Third Embodiment (1) Optical Configuration of Imaging Lens

Figure 5:
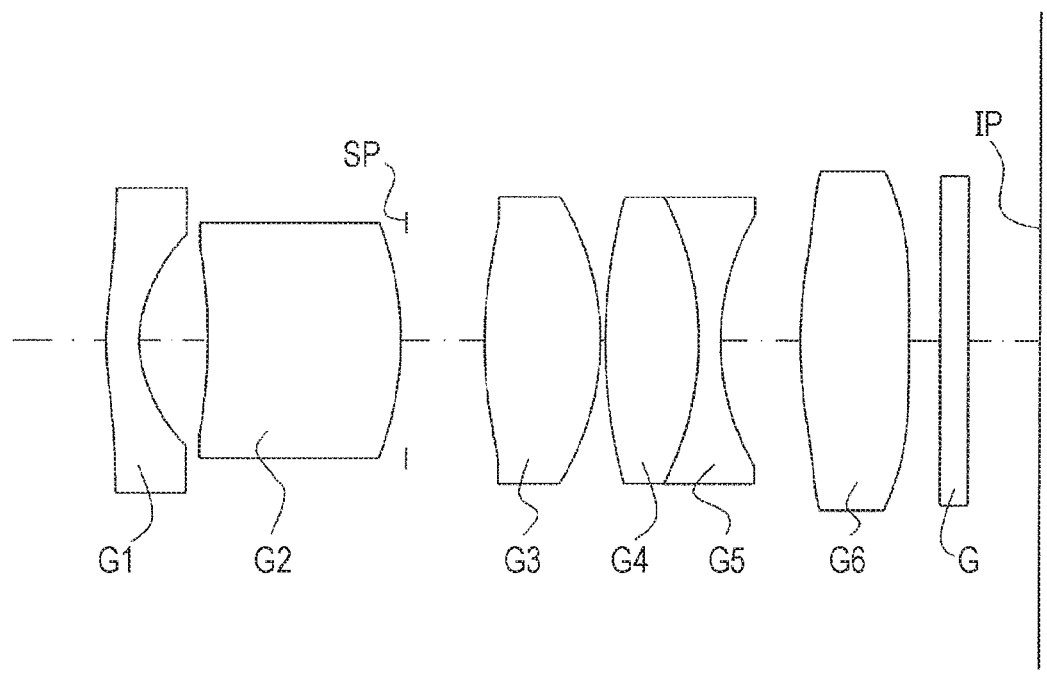
FIG. 5 is a cross-sectional view showing a lens configuration example of an imaging lens of a third embodiment of the present invention.

FIG. 5 is a lens cross-sectional view showing a configuration of an imaging lens of a third embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a cemented lens obtained by cementing a fourth lens G4 having a positive refractive power and having a convex surface on an image side and a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens G1, both surfaces of the third lens G3, and both surfaces of the sixth lens G6 is an aspherical surface.

(2) Numerical Example

Figure 6:
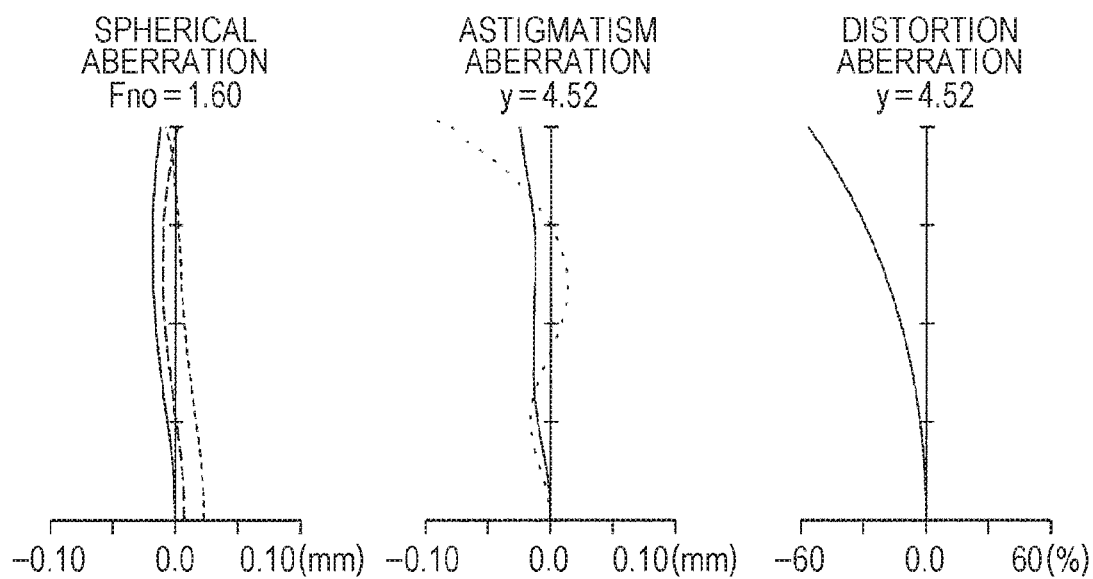
FIG. 6 shows a spherical aberration diagram, an astigmatism aberration diagram, and a distortion aberration diagram when the imaging lens of the third embodiment is focused at infinity.

Next, a numerical example which adopts a detailed numerical value of the imaging lens employed in the third embodiment will be described. Tables 9 to 12 respectively show lens data of the imaging lens, various data of the imaging lens, spherical data, and average linear expansion coefficients of glass materials forming the fourth lens and the fifth lens at −30° C. to 70° C. Further, Table 25 shows numerical values of each conditional expression of the imaging lens. Further, FIG. 6 shows a longitudinal aberration diagram of the imaging lens when focused at infinity.

TABLE 9

| Surface number | r | d | nd | vd |
|---|---|---|---|---|
| *1 | 9.200 | 1.060 | 1.8513 | 40.1 |
| *2 | 3.413 | 2.206 | | |
| 3 | −17.850 | 6.200 | 1.8081 | 22.76 |
| 4 | −10.350 | 0.184 | | |
| 5 (Diaphragm) | INF | 2.512 | | |
| *6 | 13.875 | 3.730 | 1.5920 | 67.02 |
| *7 | −8.204 | 0.150 | | |
| 8 | 17.260 | 3.000 | 1.7725 | 49.61 |

TABLE 9-continued

| Surface number | r | d | nd | vd |
|---|---|---|---|---|
| 9 | −9.880 | 0.700 | 1.8081 | 22.69 |
| 10 | 7.810 | 2.565 | | |
| *11 | 14.281 | 3.490 | 1.8513 | 40.1 |

TABLE 9-continued

| Surface number | r | d | nd | vd |
|---|---|---|---|---|
| *12 | −499.513 | 1.000 | | |
| 13 | INF | 0.900 | 1.5163 | 64.15 |
| 14 | INF | 2.304 | | |

TABLE 10

| | |
|---|---|
| Focal length | 5.3287 (mm) |
| F value | 1.6 |
| Half angle of view | 63.08 (°) |
| Image height | 4.52 (mm) |
| Total lens length | 30 (mm) |
| BF (in air) | 3.895 (mm) |

TABLE 11

| Surface number | k | A4 | A6 | A8 | A10 |
|---|---|---|---|---|---|
| 1 | −5.6465E−01 | −4.6442E−03 | 2.2679E−04 | −6.2466E−06 | 7.4370E−08 |
| 2 | −3.5828E+00 | 3.4297E−03 | −2.6920E−04 | 3.0042E−05 | −8.9093E−07 |
| 6 | 1.9441E−01 | −2.9544E−04 | −8.1230E−06 | 3.5242E−07 | −1.5261E−08 |
| 7 | −4.3080E−02 | 2.2795E−04 | −4.6133E−06 | 2.5449E−07 | −1.0877E−08 |
| 11 | −9.6812E−02 | −5.7700E−04 | 2.1224E−06 | −6.8277E−07 | 2.3953E−08 |
| 12 | −3.3333E−04 | −1.2341E−03 | 1.2296E−05 | −3.2676E−07 | 1.0563E−08 |

TABLE 12

| | |
|---|---|
| Fourth lens | 58 (1e−7/K) |
| Fifth lens | 93 (1e−7/K) |

Fourth Embodiment (1) Optical Configuration of Imaging Lens

Figure 7:
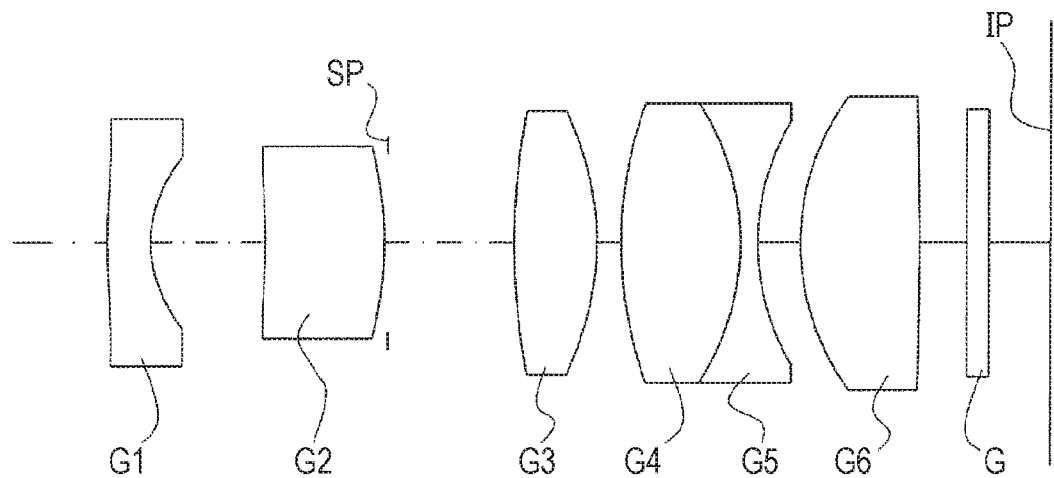
FIG. 7 is a cross-sectional view showing a lens configuration example of an imaging lens of a fourth embodiment of the present invention.

FIG. 7 is a lens cross-sectional view showing a configuration of an imaging lens or a fourth embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a cemented lens obtained by cementing a fourth lens G4 having a positive refractive power and having a convex surface on an image side and a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens and both surfaces of the third lens G3 is an a spherical surface.

(2) Numerical Example

Figure 8:
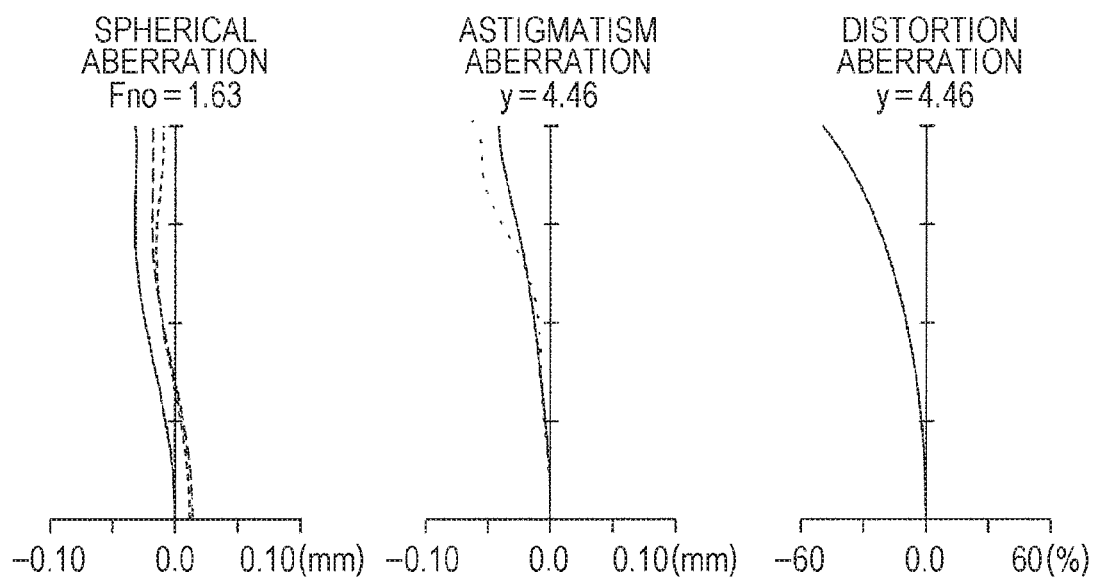
FIG. 8 shows a spherical aberration diagram, an astigmatism aberration diagram, and a distortion aberration diagram when the imaging lens of the fourth embodiment is focused at infinity.

Next, a numerical example which adopts a detailed numerical value of the imaging lens employed in the fourth embodiment will be described. Tables 13 to 16 respectively show lens data of the imaging lens, various data of the imaging lens, aspherical data, and average linear expansion coefficients of glass materials forming the fourth lens and the fifth lens at −30° C. to 70° C. Further, Table 25 shows numerical values of each conditional expression of the imaging lens. Further, FIG. 8 shows a longitudinal aberration diagram of the imaging lens when focused at infinity.

TABLE 13

| Surface number | r | d | nd | vd |
|---|---|---|---|---|
| *1 | 23.544 | 1.746 | 1.8478 | 40.12 |
| *2 | 4.572 | 4.619 | | |
| 3 | −38.415 | 4.800 | 1.8081 | 22.76 |
| 4 | −15.244 | 0.150 | | |
| 5 (Diaphragm) | INF | 5.093 | | |
| *6 | 26.218 | 3.338 | 1.5925 | 66.92 |
| *7 | −11.179 | 0.981 | | |
| 8 | 16.438 | 4.800 | 1.7292 | 54.67 |
| 9 | −10.241 | 0.700 | 1.7521 | 25.05 |
| 10 | 9.551 | 1.718 | | |
| 11 | 9.856 | 4.800 | 1.6180 | 63.41 |
| 12 | −166.826 | 1.900 | | |
| 13 | INF | 0.900 | 1.5163 | 64.15 |
| 14 | INF | 2.470 | | |

TABLE 14

| | |
|---|---|
| Focal length | 5.3306 (mm) |
| F value | 1.634 |
| Half angle of view | 59.13 (°) |
| Image height | 4.46 (mm) |
| Total lens length | 38.015 (mm) |
| BF (in air) | 4.952 (mm) |

TABLE 15

| Surface number | k | A4 | A6 | A8 | A10 |
|---|---|---|---|---|---|
| 1 | 4.3221E−03 | −1.2567E−03 | 4.6270E−05 | −1.1569E−06 | 1.3316E−08 |
| 2 | −1.0609E+00 | −8.0063E−04 | 8.8794E−05 | −2.8040E−06 | 6.1943E−08 |
| 6 | 0.0000E+00 | −2.5227E−05 | −6.8084E−07 | −9.4821E−09 | 6.4165E−10 |
| 7 | 0.0000E+00 | 1.1878E−04 | 5.7520E−07 | −3.7237E−08 | 8.4484E−10 |

TABLE 16

| | |
|---|---|
| Fourth lens | 56 (1e−7/K) |
| Fifth lens | 64 (1e−7/K) |

Fifth Embodiment (1) Optical Configuration of Imaging Lens

Figure 9:
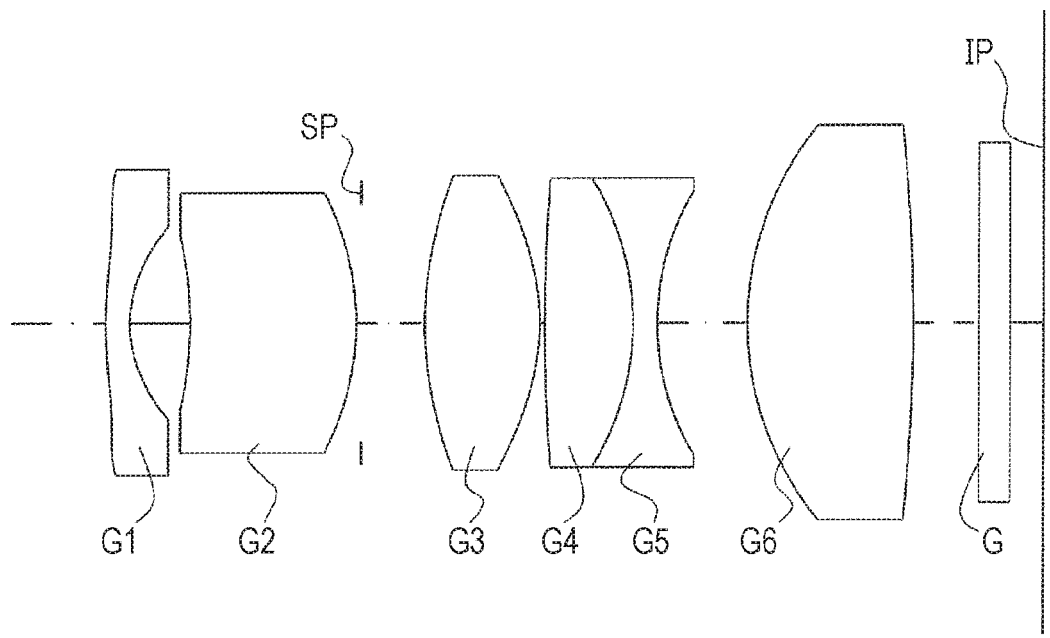
FIG. 9 is a cross-sectional view showing a lens configuration example of an imaging lens of a fifth embodiment of the present invention.

FIG. 9 is a lens cross-sectional view showing a configuration of an imaging lens of a fifth embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a cemented lens obtained by cementing a fourth lens G4 having a positive refractive power and having a convex surface on an image side and a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens G1 and both surfaces of the third lens G3 is an aspherical surface.

(2) Numerical Example

Figure 10:
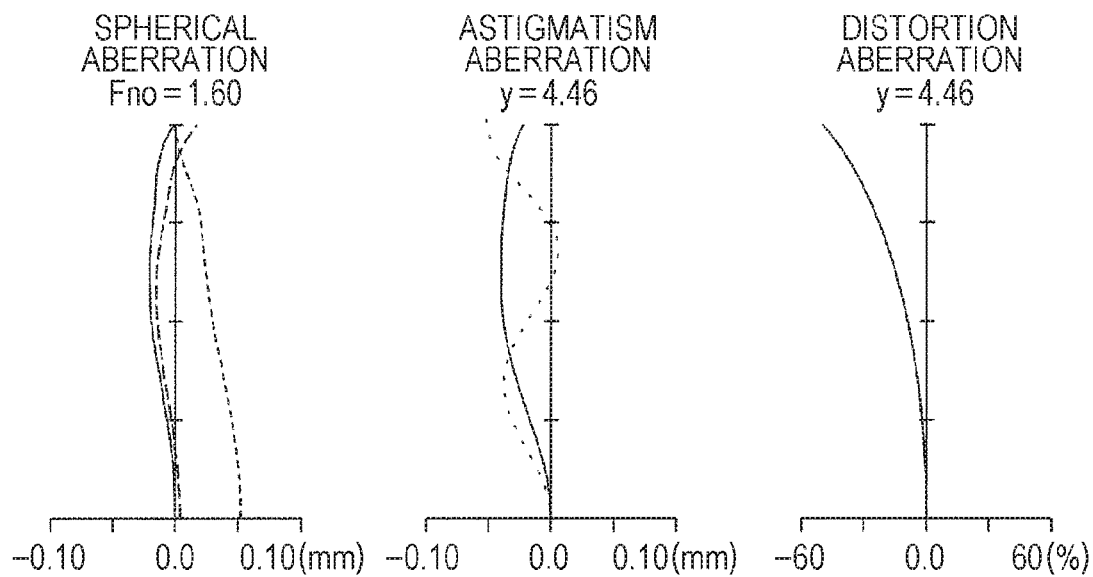
FIG. 10 shows a spherical aberration diagram, an astigmatism aberration diagram, and a distortion aberration diagram when the imaging lens of the fifth embodiment is focused at infinity.

Next, a numerical example which adopts a detailed numerical value of the imaging lens employed in the fifth embodiment will be described. Tables 17 to 20 respectively show lens data of the imaging lens, various data of the imaging lens, aspherical data, and average linear expansion coefficients of glass materials forming the fourth lens and the fifth lens at −30° C. to 70° C. Further, Table 25 shows numerical values of each conditional expression of the imaging lens. Further, FIG. 10 shows a longitudinal aberration diagram of the imaging lens when focused at infinity.

TABLE 17

| Surface number | r | d | nd | vd |
|---|---|---|---|---|
| *1 | 10.436 | 0.700 | 1.8478 | 40.12 |
| *2 | 3.351 | 1.750 | | |
| 3 | −10.981 | 4.800 | 1.8081 | 22.76 |
| 4 | −8.073 | 0.150 | | |
| 5 (Diaphragm) | INF | 1.840 | | |
| *6 | 10.290 | 3.328 | 1.5925 | 66.92 |
| *7 | −6.867 | 0.150 | | |
| 8 | 52.377 | 2.550 | 1.7292 | 54.67 |
| 9 | −7.854 | 0.700 | 1.7521 | 25.05 |
| 10 | 7.307 | 2.613 | | |

TABLE 17-continued

| Surface number | r | d | nd | vd |
|---|---|---|---|---|
| 11 | 8.864 | 4.800 | 1.6180 | 63.41 |
| 12 | −54.282 | 1.900 | | |
| 13 | INF | 0.900 | 1.5163 | 64.15 |
| 14 | INF | 0.970 | | |

TABLE 18

| | |
|---|---|
| Focal length | 5.3268 (mm) |
| F value | 1.6 |
| Half angle of view | 59.27 (°) |
| Image height | 4.46 (mm) |
| Total lens length | 27.15 (mm) |
| BF (in air) | 3.452 (mm) |

TABLE 19

| Surface number | k | A4 | A6 | A8 | A10 |
|---|---|---|---|---|---|
| 1 | −6.3820E−01 | −5.6239E−03 | 4.7467E−04 | −2.7748E−05 | 7.1321E−07 |
| 2 | −2.4350E+00 | 2.5196E−04 | 6.1177E−04 | −5.9906E−05 | 2.9538E−06 |
| 6 | 0.0000E+00 | −3.7188E−04 | 7.3101E−06 | −5.3021E−07 | 2.7372E−08 |
| 7 | 0.0000E+00 | 6.1847E−04 | 1.0525E−05 | −6.7956E−07 | 3.4378E−08 |

TABLE 20

| | |
|---|---|
| Fourth lens | 56 (1e−7/K) |
| Fifth lens | 64 (1e−7/K) |

Sixth Embodiment

Optical Configuration of Imaging Lens

Figure 11:
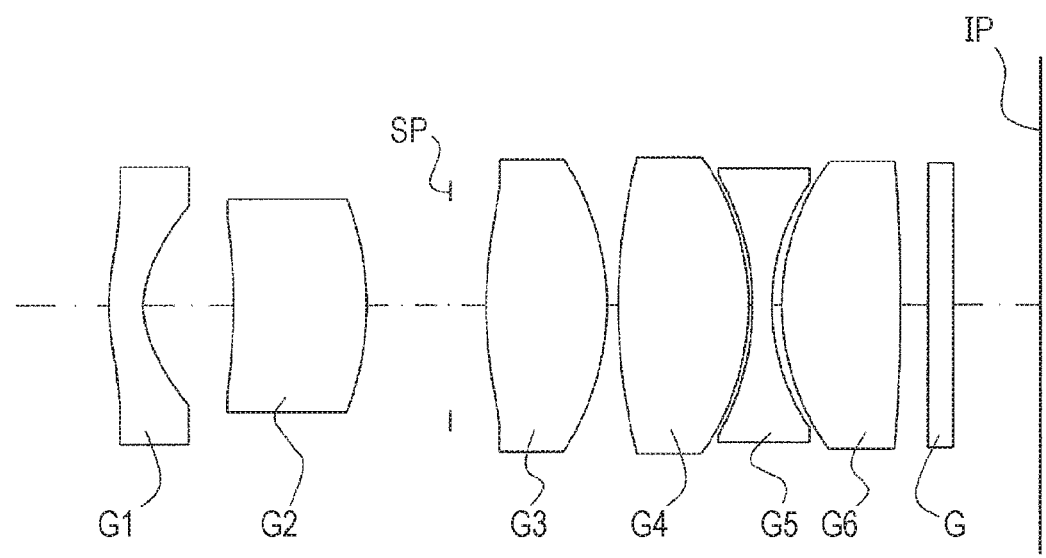
FIG. 11 is a cross-sectional view showing a lens configuration example of an imaging lens of a sixth embodiment of the present invention.
Figure 12:
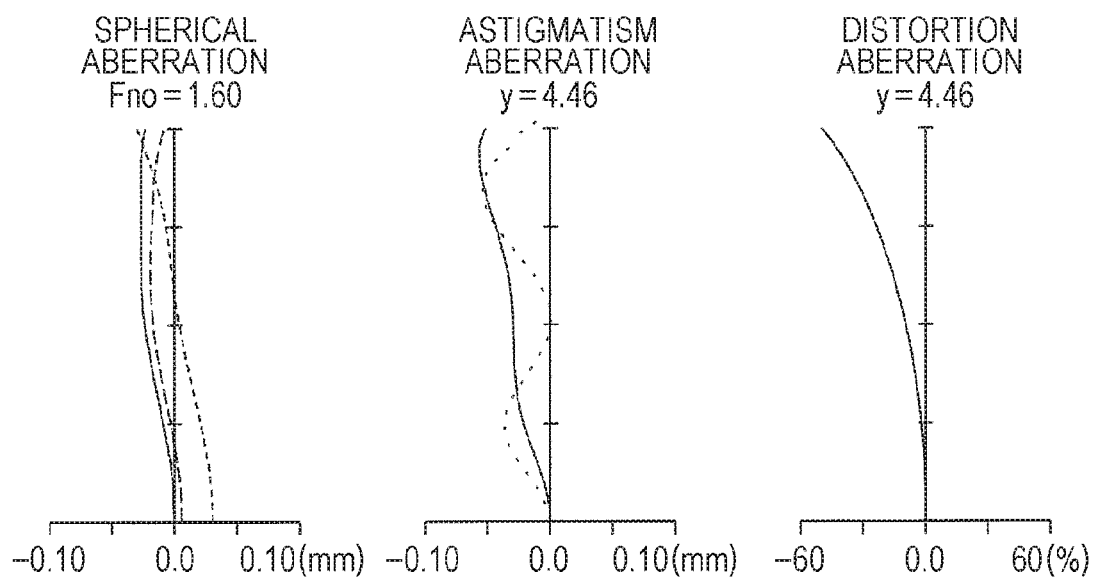
FIG. 12 shows a spherical aberration diagram, an astigmatism aberration diagram, and a distortion aberration diagram when the imaging lens of the sixth embodiment is focused at infinity.

FIG. 11 is a lens cross-sectional view showing a configuration of an imaging lens of a sixth embodiment according to the present invention. The imaging lens includes a first lens G1 having a negative refractive power and having a meniscus shape with a convex surface on an object side and a convex surface on an object side, a second lens G2 having a positive refractive power and having a meniscus shape with a concave surface on an object side and a convex surface on an image side, a third lens G3 having a positive refractive power and having a biconvex shape, a fourth lens G4 having a positive refractive power and having a convex surface on an image side, a fifth lens G5 having a biconcave shape, and a sixth lens G6 having a positive refractive power and having a biconvex shape, which are sequentially arranged from the object side. The aperture stop S is disposed on the image side of the second lens G2. The imaging lens is a fixed focus lens with a fixed focal length. Each of both surfaces of the first lens G1 and both surfaces of the third lens G3 is an aspherical surface.

(2) Numerical Example

Next, a numerical example which adopts a detailed numerical value of the imaging lens employed in the sixth embodiment will be described. Tables 21 to 24 respectively show lens data of the imaging lens, various data of the imaging lens, aspherical data, and average linear expansion coefficients of glass materials forming the fourth lens and the fifth lens at −30° C. to 70° C. Further, Table 25 shows numerical values of each conditional expression of the imaging lens. Further, FIG. 10 shows a longitudinal aberration diagram of the imaging lens when focused at infinity.

TABLE 21

| Surface number | r | d | nd | vd |
|---|---|---|---|---|
| *1 | 7.190 | 1.240 | 1.8513 | 40.1 |
| *2 | 2.996 | 3.257 | | |
| 3 | −21.075 | 4.800 | 1.6129 | 37.01 |
| 4 | −10.369 | 3.025 | | |
| 5 (Diaphragm) | INF | 1.283 | | |
| *6 | 15.349 | 4.350 | 1.5920 | 67.02 |
| *7 | −9.148 | 0.414 | | |
| 8 | 21.443 | 4.690 | 1.6030 | 65.46 |
| 9 | −9.190 | 0.150 | | |
| 10 | −9.349 | 0.700 | 1.7618 | 26.61 |
| 11 | 7.758 | 0.357 | | |
| 12 | 8.599 | 4.270 | 1.7292 | 54.67 |
| 13 | −68.349 | 1.000 | | |
| 14 | INF | 0.900 | 1.5163 | 64.15 |
| 15 | INF | 3.146 | | |

TABLE 22

| | |
|---|---|
| Focal length | 5.33 (mm) |
| F value | 1.6 |
| Half angle of view | 59.1 (°) |
| Image height | 4.46 (mm) |
| Total lens length | 33.58 (mm) |
| BF (in air) | 4.727 (mm) |

TABLE 23

| Surface number | k | A4 | A6 | A8 | A10 |
|---|---|---|---|---|---|
| 1 | −2.0375E+00 | −4.5404E−03 | 1.8782E−04 | −4.3223E−06 | 4.2152E−08 |
| 2 | −2.9909E+00 | 2.5856E−03 | −2.9708E−04 | 2.5203E−05 | −7.3918E−07 |
| 6 | 0.0000E+00 | −2.4765E−04 | −2.7521E−06 | −4.5816E−08 | −3.0895E−09 |
| 7 | 0.0000E+00 | 1.5283E−04 | 8.7627E−07 | −1.7680E−07 | 2.5664E−09 |

TABLE 24

| | |
|---|---|
| Fourth lens | 93 (1e-7/K) |
| Fifth lens | 84 (1e-7/K) |

TABLE 25

| | First embodiment | Second embodiment | Third embodiment | Fourth embodiment | Fifth embodiment | Sixth embodiment |
|---|---|---|---|---|---|---|
| (1) R11/f | 2.37 | 1.46 | 1.73 | 4.42 | 1.96 | 1.35 |
| (2) D1/f | 0.19 | 0.19 | 0.20 | 0.33 | 0.13 | 0.23 |
| (3) f1/f | −1.19 | −1.17 | −1.31 | −1.31 | −1.14 | −1.31 |
| (4) (d1 − 2)/f | 0.50 | 0.44 | 0.41 | 0.87 | 0.33 | 0.61 |
| (5) f2/f | 5.05 | 4.77 | 4.18 | 5.37 | 4.08 | 5.34 |
| (6) f3/f | 1.86 | 1.92 | 1.74 | 2.57 | 1.41 | 1.94 |
| (7) f6/f | 2.82 | 3.44 | 3.07 | 2.85 | 2.38 | 2.01 |
| (8) ν3,6 | 65.17 | 65.22 | 53.56 | 65.17 | 65.17 | 60.85 |
| (9) θ | 59.19 | 59.07 | 63.08 | 59.13 | 59.27 | 59.10 |
| (10) EN/f | 0.67 | 0.70 | 0.73 | 0.89 | 0.56 | 0.96 |
| (11) f/(4 × YS1) | 0.80 | 0.80 | 0.80 | 0.82 | 0.80 | 0.80 |
| (12) (Ymax − f × tanθ)/(f × tanθ) | −0.50 | −0.50 | −0.57 | −0.50 | −0.50 | −0.50 |
| (13) f45/f | −3.66 | −6.44 | −3.57 | −7.41 | −2.10 | −2.55 |
| (14) \|α4 − α5\| (1e-7/K) | 9.00 | 9.00 | 35.00 | 8.00 | 8.00 | 9.00 |

INDUSTRIAL APPLICABILITY

According to the present invention, it is possible to provide an imaging lens and an imaging device with a wide angle of view capable of forming an image of an object near an optical axis with a high resolution while having a small size as a whole. Therefore, the present invention is suitable for imaging devices mounted on various moving objects (land moving objects, air moving objects, and sea moving objects) and imaging devices such as monitoring imaging devices and crime prevention imaging devices installed and fixed to various buildings and is particularly suitable for sensing cameras mounted on various moving objects and used for detecting or recognizing forward or peripheral objects of the moving objects.

REFERENCE SIGNS LIST

G1 FIRST LENS
G2 SECOND LENS
G3 THIRD LENS
G4 FOURTH LENS
G5 FIFTH LENS
G6 SIXTH LENS
S APERTURE STOP
IP IMAGE PLANE

The invention claimed is:
1. An imaging lens substantially comprising:
a first lens which has a convex surface on an object side and has a negative refractive power;
a second lens which has a concave surface on an object side;
a third lens;
a fourth lens;
a fifth lens; and
a sixth lens, wherein the first to sixth lenses are sequentially arranged from the object side,
wherein the following conditions are satisfied:

$$1.30 < R11/f < 10.0 \quad (1)$$

where
R11 is a paraxial curvature radius of an object side surface of the first lens, and
f is a focal length of the imaging lens,
wherein the sixth lens is a positive lens of which an image side is a convex surface, and
wherein the following conditions are satisfied:

$$-1.4 < f1/f < -1.0 \quad (3)$$

where
f1 is a focal length of the first lens.

2. The imaging lens according to claim 1, wherein the following conditions are satisfied:

$$0.05 < D1/f < 0.50 \quad (2)$$

where
D1 is a thickness on an optical axis of the first lens.

3. The imaging lens according to claim 1, wherein the following conditions are satisfied:

$$0.2 < d_{1\text{-}2}/f < 1.5 \quad (4)$$

where
d1-2 is an air distance on an optical axis between the first lens and the second lens.

4. The imaging lens according to claim 1, wherein the following conditions are satisfied:

$$2.0 < f2/f < 10.0 \quad (5)$$

where
f2 is a focal length of the second lens.

5. The imaging lens according to claim 1, wherein at least one surface of the first lens is an aspherical surface.

6. The imaging lens according to claim 1, wherein the following conditions are satisfied:

$$1.0 < f3/f < 5.0 \quad (6)$$

where
f3 is a focal length of the third lens.

7. The imaging lens according to claim 1, wherein the third lens has convex surfaces on both surfaces and has a positive refractive power.

8. The imaging lens according to claim 1, wherein at least one surface of the third lens is an aspherical surface.

9. The imaging lens according to claim 1, wherein the following conditions are satisfied:

$$1.0 < f6/f < 5.0 \quad (7)$$

where
f6 is a focal length of the sixth lens.

10. The imaging lens according to claim 1, wherein the following conditions are satisfied:

$$50 < v_{3,6} \quad (8)$$

where
$v_{3,6}$ is an average Abbe number for d lines of the third lens and the sixth lens.

11. The imaging lens according to claim 1, wherein the following conditions are satisfied:

$$45° < \theta \quad (9)$$

where
θ is a half angle of view (ω) of the imaging lens.

12. The imaging lens according to claim 1, wherein the following conditions are satisfied:

$$EN/f < 1.5 \quad (10)$$

where
EN is a distance on an optical axis between the object side surface of the first lens and an entrance pupil position of the imaging lens.

13. The imaging lens according to claim 1, wherein the following conditions are satisfied:

$$f/(4 \times YS1) \leq 1.0 \quad (11)$$

where
YS1 is an upper light ray maximum height of light ray on axis of the object side surface of the first lens.

14. The imaging lens according to claim 1, wherein the following conditions are satisfied:

$$(Y\max - f \times \tan \theta)/(f \times \tan \theta) < -0.3 \quad (12)$$

where
Ymax is an image height of an effective image circle, and
θ is a half angle of view (ω) of the imaging lens.

15. The imaging lens according to claim 1, wherein the fourth lens has a positive refractive power and the fifth lens has a negative refractive power, and
wherein the following conditions are satisfied:

$$-10.0 < f45/f < -1.0 \quad (13)$$

where
f45 is a combined focal length of the fourth lens and the fifth lens.

16. The imaging lens according to claim 1, wherein the fourth lens and the fifth lens are cemented, and
wherein the following conditional expression is satisfied:

$$0 \leq |\alpha 4 - \alpha 5| < 50 \times 10^{-7} \quad (14)$$

where
α4 is an average linear expansion coefficient $(1 \times 10^{-7}/K)$ from −30° C. to 70° C. of a glass material forming the fourth lens, and
α5 is an average linear expansion coefficient $(1 \times 10^{-7}/K)$ from −30° C. to 70° C. of a glass material forming the fifth lens.

17. An imaging device comprising:
the imaging lens according to claim 1; and
an image sensor which receives an optical image formed by the imaging lens and converts the optical image into an electric image signal.

18. An imaging lens substantially comprising:
a first lens which has a convex surface on an object side and has a negative refractive power;
a second lens which has a concave surface on an object side;
a third lens;
a fourth lens;
a fifth lens; and
a sixth lens,
wherein the first to sixth lenses are sequentially arranged from the object side,
wherein the following conditions are satisfied:

$$1.30 < R11/f < 10.0 \quad (1)$$

where
R11 is a paraxial curvature radius of an object side surface of the first lens, and
f is a focal length of the imaging lens,
wherein the following conditions are satisfied:

$$-1.4 < f1/f < -0.8 \quad (3)$$

where
f1 is a focal length of the first lens, and
wherein the following conditions are satisfied:

$$3.0 < f2/f < 10.0 \quad (5)$$

where
f2 is a focal length of the second lens.

* * * * *